(12) United States Patent
Mumick et al.

(10) Patent No.: US 7,584,249 B2
(45) Date of Patent: Sep. 1, 2009

(54) SYNCHRONIZATION AMONG PLURAL BROWSERS USING A STATE MANAGER

(76) Inventors: Inderpal Singh Mumick, 85 Swenson Cir., Berkeley Heights, NJ (US) 07922; Sandeep Sibal, 91 Bhuvaneshwari Nagar, C.V. Raman Nagar Post, Bangalore, Karnataka (IN) 560093

( * ) Notice: Subject to any disclaimer, the term of this patent is extended or adjusted under 35 U.S.C. 154(b) by 0 days.

(21) Appl. No.: 11/973,467

(22) Filed: Oct. 9, 2007

(65) Prior Publication Data

US 2008/0098130 A1    Apr. 24, 2008

Related U.S. Application Data

(62) Division of application No. 11/252,250, filed on Oct. 17, 2005, now abandoned, which is a division of application No. 10/187,486, filed on Jul. 1, 2002, now Pat. No. 6,983,307.

(60) Provisional application No. 60/304,499, filed on Jul. 11, 2001.

(51) Int. Cl.
*G06F 15/16* (2006.01)
(52) U.S. Cl. ...................................... 709/205
(58) Field of Classification Search ................. 709/248, 709/219, 223, 205; 370/401; 455/414.2
See application file for complete search history.

(56) References Cited

U.S. PATENT DOCUMENTS

| | | | | |
|---|---|---|---|---|
| 5,809,415 | A * | 9/1998 | Rossmann | 455/422.1 |
| 5,954,798 | A * | 9/1999 | Shelton et al. | 709/224 |
| 6,151,622 | A * | 11/2000 | Fraenkel et al. | 709/205 |
| 6,195,357 | B1 * | 2/2001 | Polcyn | 370/401 |
| 6,349,132 | B1 * | 2/2002 | Wesemann et al. | 379/88.17 |
| 6,418,199 | B1 * | 7/2002 | Perrone | 379/88.01 |
| 6,418,471 | B1 * | 7/2002 | Shelton et al. | 709/227 |
| 6,494,762 | B1 * | 12/2002 | Bushmitch et al. | 446/268 |
| 6,594,348 | B1 * | 7/2003 | Bjurstrom et al. | 379/88.13 |
| 6,601,170 | B1 * | 7/2003 | Wallace, Jr. | 713/168 |
| 6,604,075 | B1 * | 8/2003 | Brown et al. | 704/270.1 |
| 6,606,611 | B1 * | 8/2003 | Khan | 706/10 |
| 6,609,005 | B1 * | 8/2003 | Chern | 455/457 |
| 6,668,055 | B2 * | 12/2003 | Marwell et al. | 379/265.13 |
| 6,738,803 | B1 * | 5/2004 | Dodrill et al. | 709/218 |
| 6,771,743 | B1 * | 8/2004 | Butler et al. | 379/67.1 |
| 6,807,254 | B1 * | 10/2004 | Guedalia et al. | 379/88.1 |
| 6,807,529 | B2 * | 10/2004 | Johnson et al. | 704/270.1 |

(Continued)

*Primary Examiner*—David Y Eng
(74) *Attorney, Agent, or Firm*—Ash Tankha

(57) ABSTRACT

A technique for synchronizing a visual browser and a voice browser. A visual browser is used to navigate through visual content, such as WML pages. During the navigation, the visual browser creates a historical record of events that have occurred during the navigation. The voice browser uses this historical record to navigate the content in the same manner as occurred on the visual browser, thereby synchronizing to a state equivalent to that of the visual browser. The creation of the historical record may be performed by using a script to trap events, where the script contains code that records the trapped events. The synchronization technique may be used with a multi-modal application that permits the mode of input/output (I/O) to be changed between visual and voice browsers. When the mode is changed from visual to voice, the record of events captured by the visual browser is provided to the voice browser, thereby allowing the I/O mode to change seamlessly from visual to voice. Likewise, the voice browser captures events which may be provided to the visual browser when the I/O mode is changed from voice to visual.

18 Claims, 7 Drawing Sheets

U.S. PATENT DOCUMENTS 6,820,116 B1 * 11/2004 Pyhalammi et al. ......... 709/219
6,865,608 B2 * 3/2005 Hunter ....................... 709/229
6,976,077 B1 * 12/2005 Lehew et al. ................ 709/229
6,976,094 B1 * 12/2005 Dalrymple et al. .......... 709/248
6,983,273 B2 * 1/2006 Banerjee et al. ................ 707/3
7,080,315 B1 * 7/2006 Lucas et al. .................. 715/201
7,225,225 B2 * 5/2007 Kuki et al. ................... 709/205

* cited by examiner

SYNCHRONIZATION AMONG PLURAL BROWSERS USING A STATE MANAGER

CROSS-REFERENCE TO RELATED APPLICATIONS

This application is a divisional application of application Ser. No. 11/252,250 filed 17 Oct. 2005 now abandoned, which is a division of Ser. No. 10/187,486 U.S. Pat. No. 6,983,307, titled "Synchronization Among Plural Browsers" filed on Jul. 1, 2002, which claims the benefit of U.S. provisional application Ser. No. 60/304,499 titled "Synchronization Among Plural Browsers" filed on Jul. 11, 2001.

FIELD OF THE INVENTION

The present invention relates generally to the field of networked computing. More particularly, the invention provides a technique for synchronizing the state of plural browsers at various levels of granularity. The technique may be used to synchronize between visual and voice browsers in wireless multi-modal applications.

BACKGROUND OF THE INVENTION

Increasingly, wireless communications devices such as wireless telephones are becoming adapted for use with the Internet. It is estimated that, by the year 2003, half of all Internet traffic will come from wireless devices. Many present-day wireless telephones have at least some capability not only to capture and render audio information, but also to allow users to interact with data using a visual display and some form of data input device. Many wireless carriers are marketing access to the so-called "wireless web" as part of wireless telephone service.

While wireless data access is clearly a boon to electronic device users, there is a notable deficiency in the current wireless data access technology: a user must generally choose to interact with the data either using the voice components of the wireless device (i.e., microphone and speaker), or using the visual components (i.e., screen and keypad), but cannot use both at the same time. Some aspects of communication work best with a visual interface, and others work best with a voice interface. For example, suppose that an application provides directions to a specified location—e.g., for use while driving. It is convenient to speak the name of the desired location as input to the application, but it is cumbersome to receive the directions themselves in the form of speech. A visual map combined with written directions such as "turn right on Elm" is a very convenient format in which to receive the directions, but it is may be less convenient to input the desired location using a keypad or stylus than it is merely to speak the location into a microphone. Thus, the ideal interface for certain applications is, in many cases, not visual or voice alone, but rather a combination of visual and voice. Present wireless application often allow one or the other but not both.

One problem that impedes the integrated and combined use of voice and visual interfaces to data is that each mode of communication generally requires its own browser. Typically, a particular piece of content (e.g., a web page) may be represented in both a visual markup language (such as Wireless Markup Language or "WML"), and in a voice markup language (such as Voice eXtensible Markup Language or "VXML"). A visual browser permits the user to navigate through the WML content using the screen and keypad. Similarly, a voice browser, which is generally a software component separate from the visual browser, permits the user to navigate through the VXML content using the microphone and speaker. Not only are the visual and voice browsers separate software components; they often execute on separate, and distantly located, devices. A visual browser typically executes on a wireless handset (such as a wireless-web-enabled telephone). However, the handset is generally "dumb" with respect to voice—i.e., it can capture and render audio signals, but does not have the means to browse and navigate content based on the content of the received audio, or to generate audio signals based on VXML data. Thus, a voice browser typically executes on a voice server and communicates with the user through the microphone and speaker of the wireless device by transmitting and receiving digital signals to the device through an ordinary voice circuit within a wireless network.

Because the voice and visual browsers are separate, it is difficult to switch seamlessly back and forth between a visual and voice modes of interacting with wireless data, because the voice browser may be unaware of what the visual browser is doing and vice versa. That is, the voice and visual browsers are not normally "synchronized," in the sense that neither knows the other's state with respect to the underlying content that the voice and visual browsers are manipulating. For example, suppose that a wireless handset user uses a visual browser to navigate through a series of web pages, eventually ending up at a particular URL. If the user then decides to switch to the voice interface, the voice browser does not know where the user has navigated to because it is unaware of what the visual browser has been doing. Upon switching to a voice interface, the voice browser can simply re-start the user at a "home" URL, but this is inconvenient for the user because the user loses the benefit of all of the navigation that has already been performed. Similarly, within the page located at a particular URL, the user may have navigated through several cards, and may have positioned the cursor at a particular field on a particular card using the visual browser, but the voice browser will be unaware of all of this activity. The problem, in this example, is that the voice and visual browsers are not "synchronized."

In view of the foregoing, there is a need for a browser synchronization technique that overcomes the drawbacks of the prior art.

SUMMARY OF THE INVENTION

The present invention provides a technique for the synchronization of plural browsers—e.g., the synchronization of a visual browser with a voice browser. In accordance with the invention, a first browser generates events relating to navigational activity being performed by a user. For example, in WML where a page comprises "deck" of "cards," an action wherein the user moves from one card to another may be an event. Similarly, where there may be plural fields within a single card, the act of moving a cursor from one field to another may be an event. A representation of the events that have occurred in a navigational session are recorded and are subsequently used to set a second browser to a state equivalent to that which the second browser would be in if the user had performed, on the second browser, a navigational activity equivalent to that which the user performed on the first browser.

The "state" of a browser may be defined at various levels of granularity. For example, in WML, a page consists of a deck of cards. Within a card, there may be a plurality of fields (e.g., a card that asks the user to enter his or her name and address may have two input fields, one for the user's name and one for the user's address). Within a given field, the cursor may be at a particular position. Thus, depending on the precision with which synchronization between the first and second browsers is desired, the "state" of the first browser may be defined as the currently displayed page, the currently displayed card within the page, the field to which the cursor is currently pointing, or the position of a cursor within the field. How much precision is required depends on context in which synchronization is required. In one application, it may be sufficient to say that two browsers are in the same "state" so long as they are on the same page—even if the first and second browsers are displaying different cards from that page. In another context, synchronization may require that the two browsers are presently accepting input at the same field of the same card. The present invention provides for the synchronization of two browsers at any granularity.

In one embodiment of the invention, the events generated by the first browser are captured by a script engine, which executes instructions contained in a script, such as a JAVA script. A script may be structured such that a given set of instructions that correspond to a particular event and are invoked by that event. In accordance with an aspect of the invention, the script contains instructions that, upon the occurrence of a given event, make a record documenting the fact that the event occurred. Thus, a function of the script is to produce a record documenting what events occurred during a navigational session on the first browser, and in what order those events occurred. The record of the events is sent to a state manager, which, at the time of synchronization, forwards those events to the second browser. By stepping through the same series of events that occurred on the first browser, the second browser may be put in the same state as the first browser.

In another embodiment of the invention, the first browser may be adapted to generate state information without a script. For example, a modified browser may create a record of every event that occurs directly (without using a script), or it may otherwise record information that indicates the state that it is currently in. This information may be sent to a state manager for use in synchronization the second browser with the first.

Two browser that interact with information in different formats or "modes" may be synchronized. For example, the first browser may be a visual browser that renders WML information, while the second browser may be a voice browser that renders Voice eXtensible Markup Language (VXML) information. A visual browser that is rendering a WML page may by synchronized with a voice browser that is rendering a VXML page, even if the WML and VXML pages are not identical. An equivalence relationship may be defined such that two browsers can be synchronized to equivalent states, even if complete identity of state is not possible due to the differing nature of their respective interfaces (e.g., visual vs. voice), and their different markup languages (e.g., WML vs. VXML).

The present invention's technique of synchronizing browsers may, for example, be deployed in an architecture that supports wireless multi-modal applications. For example, a wireless handset may have a browser that renders WML, plus "dumb" audio-rendering capability that produces audio from a digital signal but does not generate an audio signal from higher-level information. The generation of audio signals may be performed by a voice browser that generates audio signals from VXML input, and which is located remotely from the handset. The technique of the present invention may be used to synchronize the voice and visual browsers, such that the user can change between visual I/O and audio I/O.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF THE INVENTION

Overview

Wireless devices have traditionally been able to operate in only one input/output ("I/O") mode at a time—i.e., either in an audio mode or a visual mode. For example, a traditional wireless telephone sends and receives audio (voice). Some new wireless telephones have a small display through which the user can view the "wireless web." However, a user can use such a telephone only in one mode at a time, as the voice and visual features cannot generally be used in concert.

One way to support the use of voice and visual I/O modes in concert is for the content with which the user interacts to be provided in two similar forms—a visual markup language (such as Wireless Markup Language (WML)), and a voice markup language (such as Voice extensible Markup Language (VXML)). Supporting the concurrent use of voice and visual I/O modes in this manner generally requires that two browsers be running at the same time—one browser that generates visual images from version of the content that is in the visual markup language, and another browser that renders audio based on the version of the content that is in the voice markup language. In order to support relatively seamless switching between visual and voice I/O modes, it may be necessary to synchronize the visual and voice browsers so that both browsers are at the same navigational point, regardless of which browser the user has been using to interact with the content. The present invention provides a technique for performing this synchronization.

Exemplary Architecture for Browser Synchronization

Figure 1:
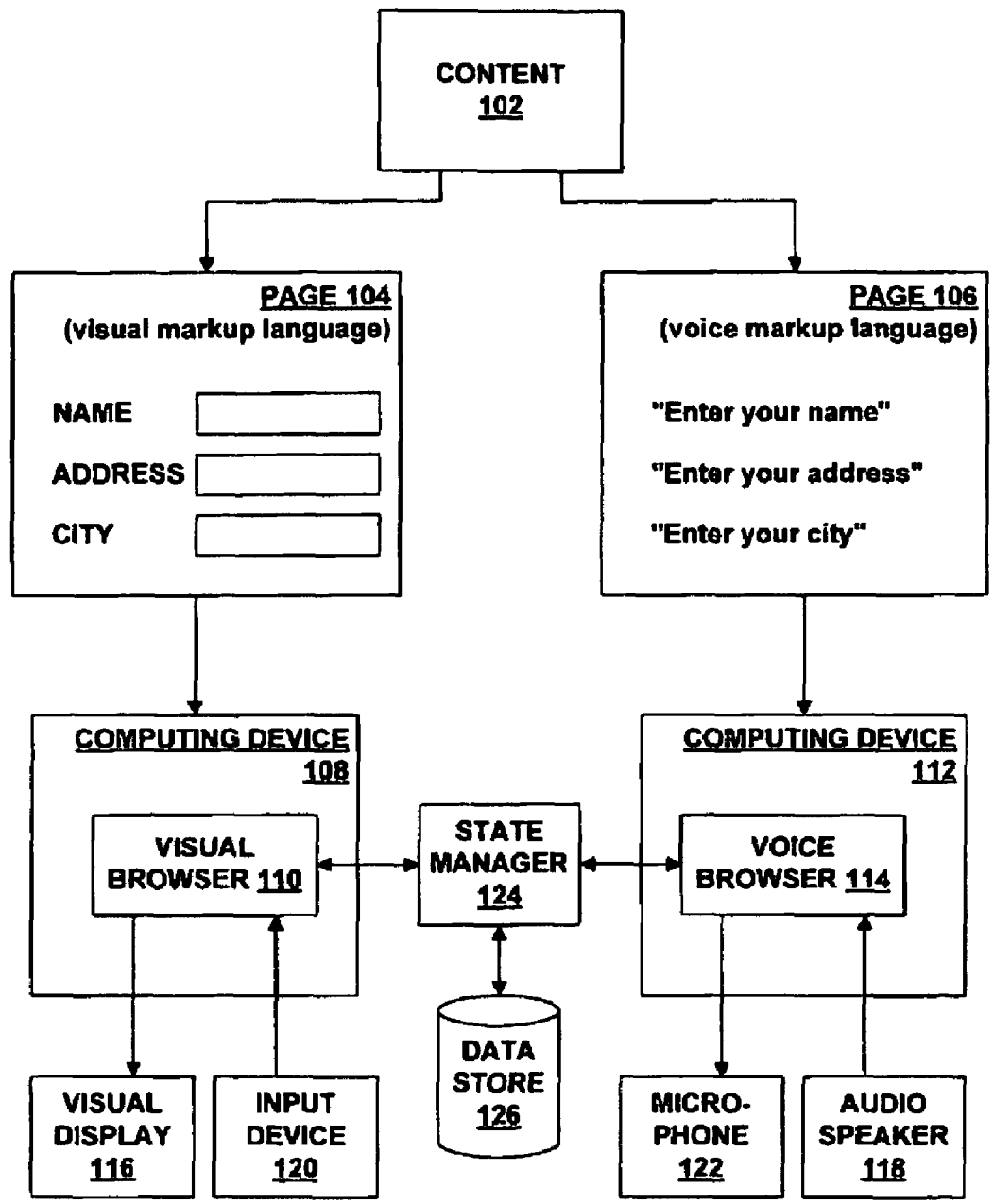
FIG. 1 is a block diagram of an architecture having plural browsers in which aspects of the invention may be deployed.

FIG. 1 shows an exemplary architecture that employs plural browsers. Content 102 is embodied as a page 104 in a visual markup language (of which WML is exemplary), and also as a page 106 in a voice markup language (of which VXML is exemplary). The substance of content 102 is an inquiry for the user's name, address, and city. As shown in FIG. 1, in a visual markup language (page 104), this inquiry may be embodied as a form that has blank spaces in which the user may type the requested information. Similarly, in a voice markup language, the same inquiry is embodied as an audio prompt that instructs the user to "enter name," "enter address," and "enter city." While page 104 is not identical to page 106, pages 104 and 106 correspond to each other in the sense that they both represent the same substantive content.

Page 104 is provided to computing device 108. Computing device 108 may be any type of device that is capable of performing computation. As is known in the art, such a device typically has a memory that stores data and instructions; a processor adapted to execute the instructions and manipulate the data stored in the memory; means for input (e.g., keypad, touch screen, microphone, etc.), and means for output (liquid crystal display (LCD), cathode ray tube (CRT), audio speaker, etc.). A computing device may also have means for communicating with other computing devices over a network—e.g., an Ethernet port, a modem, a wireless transmitter/receiver for communicating in a wireless communications network. Such a device may take the form of a personal computer (PC), laptop computer, or palm-sized computer. It will also be appreciated that many devices that are not traditionally labeled "computers" do, in fact, have computing capability. Wireless telephones, pagers, and wireless e-mail devices are examples such devices, and thus the generic term "computing device" applies to any such device, whether or not such device is traditionally described as a computer. In a preferred embodiment of the invention, computing device 108 is a wireless handset adapted to communicate in a wireless telephone network, although such an embodiment of computing device 108 is not limiting of the invention.

Visual browser 110 is a software application which is stored on computing device 108 and which executes thereon. Visual browser 110 is adapted to receive content in the form of a visual markup language page and to render that content on a visual display 116 associated with computing device 108. As one example, visual browser 110 may be a WML browser that renders WML content on the LCD display of a wireless telephone that is adapted to allow its user to interact with the "wireless web." Visual browser 110 may also be adapted to receive user data input from input device 120 associated with computing device 108. For example, input device 120 may be the keypad of a wireless telephone, and the user may use the keypad to enter data in order to interact with content that is being rendered on visual display 116 by visual browser 110. (E.g., the user may use the keypad to enter his or her name into the "name" field of page 104.)

Page 106 is also provided to computing device 112. Like computing device 108, computing device 112 may be any type of computing device. Voice browser 114 is a software application which is stored on computing device 108 and which executes thereon. Voice browser 114 is adapted to receive content in the form of a voice markup language page and to render that content on audio speaker 118. Voice browser 114 may also be adapted to receive audio user input from microphone 122 or other audio input device. For example, the user may use microphone 122 to enter data into an audio "form" that is being rendered by voice browser 114. (E.g., the user may speak his name in response to the "enter name" voice prompt that voice browser 114 renders based on voice markup language page 106.)

Figure 9:
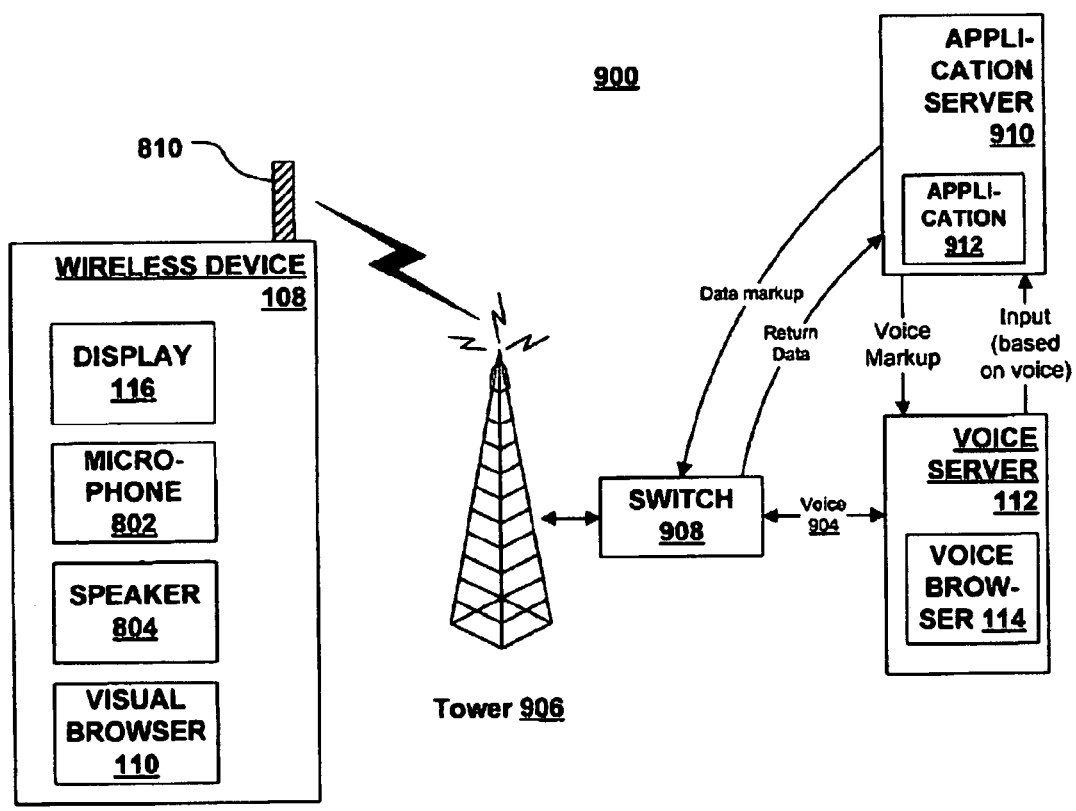
FIG. 9 is a block diagram of an exemplary system architecture in which plural synchronized browsers may be deployed.

While computing device 112 may be any type of computing device, in a preferred embodiment computing device 112 is a relatively powerful server machine that renders voice markup pages for a large network. As discussed more particularly in connection with FIG. 9 below, voice browser 114 may be associated with a wireless telephone network, and may render voice markup pages on the handsets of the users of that network. Moreover, while computing device 112 is shown as being associated with microphone 122 and audio speaker 118, the invention is not limited to the case in which voice browser 114 performs I/O on devices that are locally connected to the computing device 112 on which voice browser 114 executes. On the contrary, voice browser 114 may process audio input that is captured using a microphone on computing device 108 (which, in a preferred embodiment, is a wireless handset), and may transmit audio signals to computing device 108 for rendering on a speaker of computing device 108. FIG. 9 discusses an embodiment in which input (and output) audio signals are captured (and rendered) on a wireless handset that is accessible to voice browser 114 via a wireless connection.

Visual browser 110 may be at some "state" with respect to the user's navigation through visual markup page 104. Likewise, voice browser 114 may be at some "state" with respect to the user's navigation through voice markup page 106. Since pages 104 and 106 represent the same underlying content 102, albeit in slightly different formats (e.g., WML vs. VXML), it is possible to "synchronize" the respective states of visual browser 110 and voice browser 114 with respect to the navigation. For example, using visual browser 110, the user may point a cursor to the "address" field of page 104. Thus, a description of the state of navigation through page 104 is that the cursor is presently pointed at the "address" field of page 104 and the browser is waiting for input in that field. An equivalent state of navigation through page 106 may be voice browser 114's rendering of an "enter address" audio prompt and waiting for audio input. Thus, in this example, if voice browser 114 is "synchronized" with visual browser 110, the appropriate action for voice browser 114 may be to render the "enter address" audio prompt.

In accordance with the present invention, visual browser 110 and voice browser 114 may be synchronized by exchanging information as to their state. When the user is navigating through content 102 using visual browser 110, visual browser 110 may provide state information to state manager 124, which may store this state information in state database 126. At an appropriate time, state manager 124 may provide this state information to voice browser 114, whereby voice browser may re-create the state of visual browser 110. This process may also happen in the other direction. That is, while the user is navigating through content 102 using voice browser 114, voice browser 114 may provide state information to state manager 124 for storage in state database 126. At an appropriate time, state manager 124 may provide this state information to visual browser 110, whereby visual browser 110 may recreate the state of voice browser 114. What constitutes an "appropriate time" to transfer this state information depends on the application in which browsers are being synchronized. For example, an "appropriate time" to transfer state information may mean continuously, periodically, or every time the I/O mode in which the user is performing the navigation switches between visual and voice. The manner and format in which state information is recorded, stored, and transmitted is more particularly discussed below in connection with FIGS. 4-7.

Figure 2:
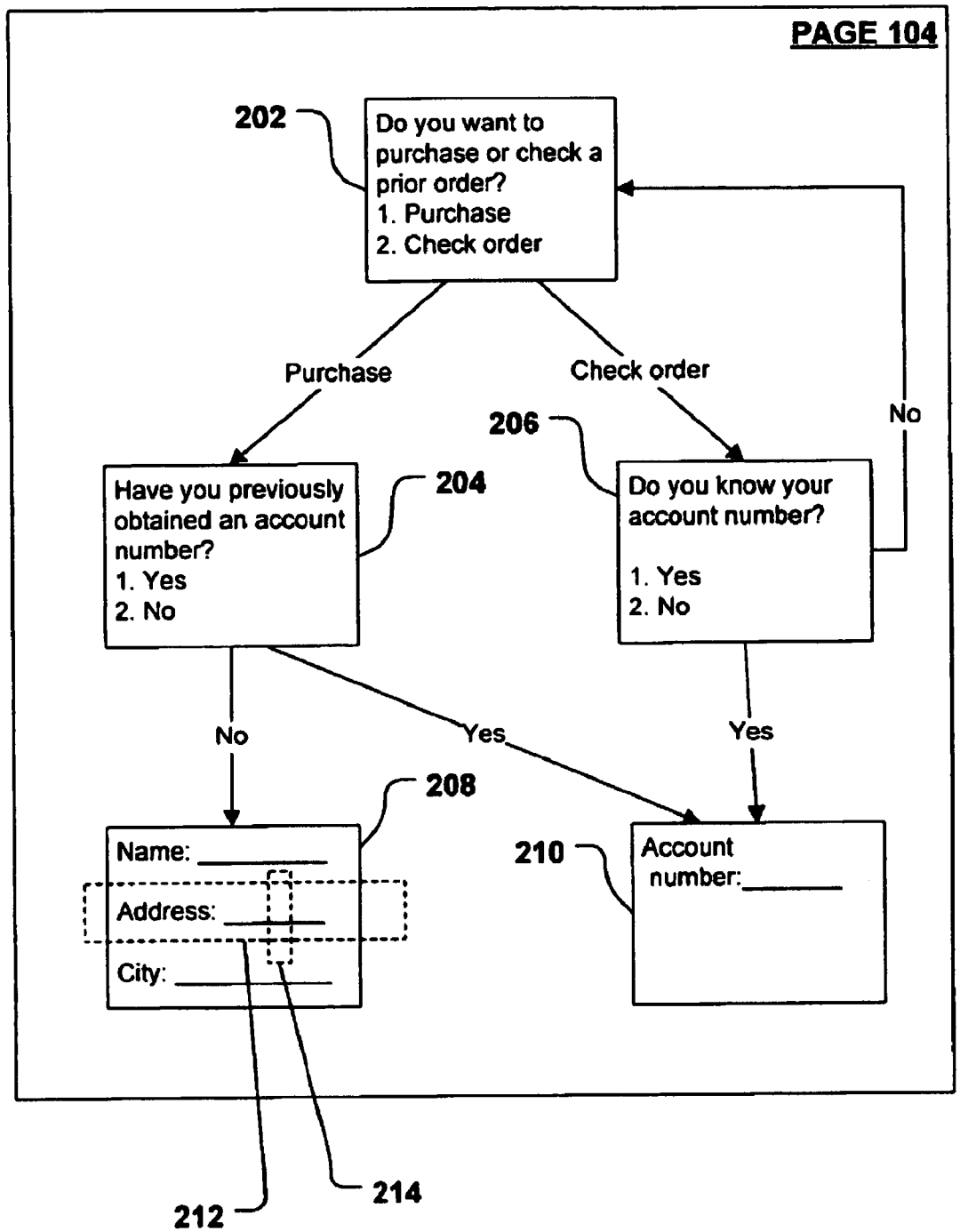
FIG. 2 is a block diagram of a page whose state may be recorded in accordance with aspects of the invention.

FIG. 2 shows the detail of a page 104. While FIG. 2 shows the detail of visual markup page 104, it will be appreciated that the structure shown in FIG. 2 and the discussion thereof applies equally to voice markup page 106. In the case of WML and VXML, it will be observed that these markup languages have similar structures in that both are organized as pages having cards (sometimes called "dialogues") which can be stepped through using a browser.

Exemplary page 104 comprises a plurality of cards 202-210. The relationship among cards 202-210 is shown by arrows. For example, card 202 displays a question to be answered by the user; the user navigates either to card 204 or card 206, depending upon which of the answer choices he or she selects at card 202. Similarly, cards 204 and 206 lead the user to different places depending upon the user's answer to a question. Navigation paths may converge; cards 204 and 206 may both lead to card 210.

The state of navigation may be defined as the place at which the user is currently performing I/O, as identified from among the entire universe of content available to the user. The location of this I/O may be identified at varying levels of precision, and this precision may be referred to as the "granularity" of the state. For example, at the coarse end of the granularity scale, the state of the user's navigation may be defined as the particular page that the user is viewing. Thus, in the example of FIG. 2, the user's state may be defined as page 104, because the user is viewing page 104 as opposed to some other page on the wireless web.

As an example of a slightly finer granularity, the state may be defined by the particular card the user is viewing. For example, the state may be defined as card 208 of page 104. At an even finer granularity, the state may be defined as the particular field of a card in which the user in entering input—e.g., the address field of card 208, as indicated by box 212. At an even finer granularity, the state may be defined as the position of the cursor in on the card, as indicated by box 214.

The effect of using the various granularities is readily apparent when one envisions performing a synchronization between two browsers at the various granularities. Suppose the user is using a first browser, and the user's cursor is positioned at box 214. At the page level of granularity, the relevant state information is that the user is navigating somewhere in page 104, and thus an attempt to synchronize the first browser with a second browser will result in the second browser being pointed to some arbitrary point on page 204 (e.g., at the beginning of the first card). At the card level of granularity, it is known not only that the user is on page 104, but also that the user is somewhere within card 208. Thus, upon synchronization, the second browser will be pointed to an arbitrary point in card 208 (e.g., the beginning of the card), but not necessarily to the place where the user's cursor was pointed in the first browser. At the field level of granularity, it is known that the user is in the "address" field of card 208, and thus synchronization results in the second browser being pointed to the "address" field, but not necessarily to any point within the address field. At the cursor level of granularity, however, it is known that the user is not only in the "address" field but is in the middle of entering data in the field. Thus, the second browser can be synchronized to a state in which a partially filled-out address is placed in the "address" field displayed on the second browser, and the cursor is in such a position that the user continue where he or she left off.

As noted above, a particularly useful application for browser synchronization is where one browser is a visual browser and the other is a voice browser. While voice browsers do not have "cursors" per se, the notion what it means for a cursor to be located at a particular "position" in a voice dialogue can be given meaning. For example, if the user had begun to enter the address "123 Elm Street," but has only entered as far as "123 El . . . " in the visual browser prior to switching to voice, the voice browser could emulate the position of a cursor by prompting the user: "You have entered: 123 El. Please continue speaking from that point."

Events

Figure 3:
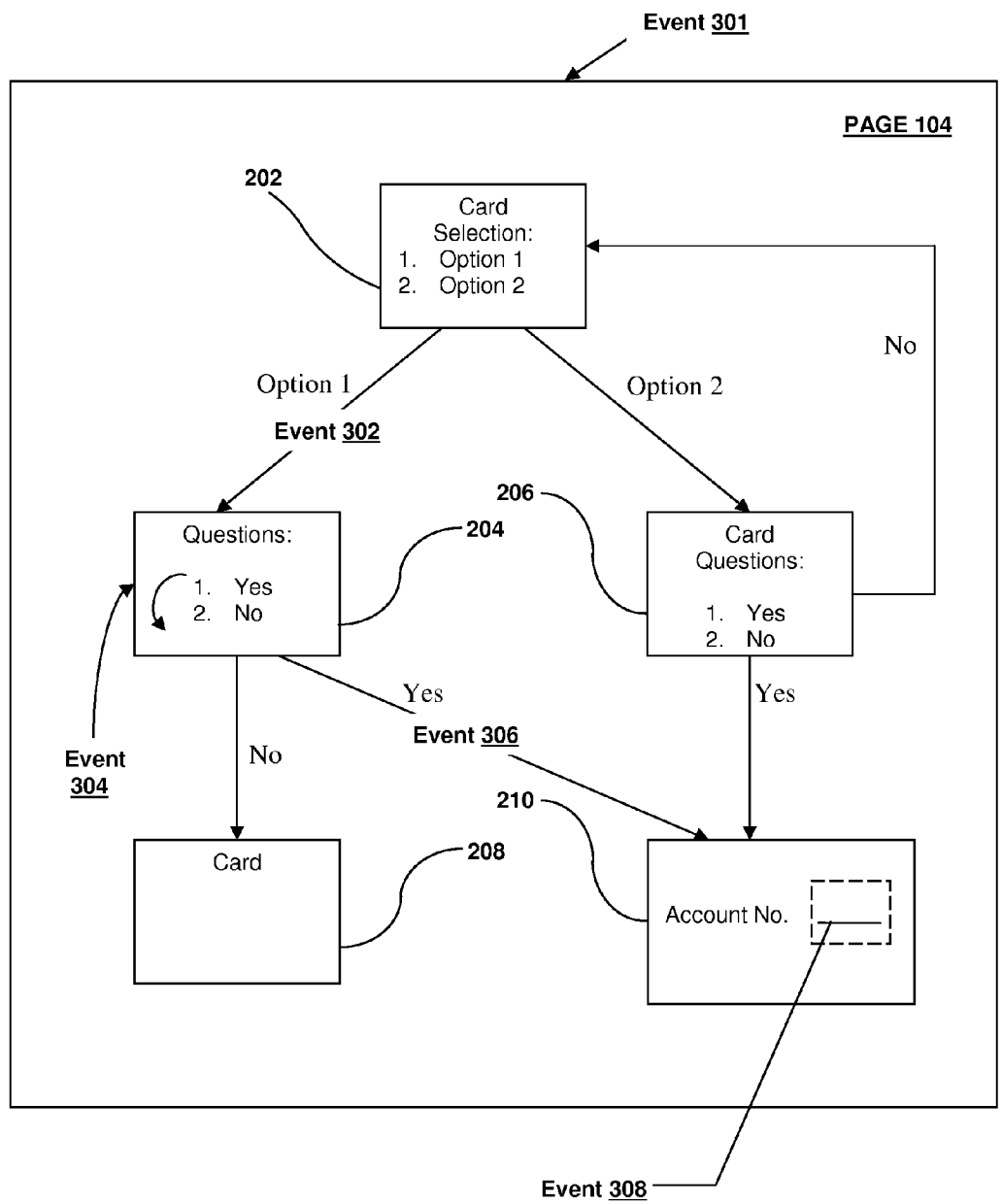
FIG. 3 is a block diagram of a page showing navigational events.

FIG. 3 shows an example of how events are generated as a user navigates to, and within, page 104. In the example of FIG. 3, the user's initial navigation to page 104 itself is an event 301. When the user enters the page, the browser, by default, is pointed to the first card 202. When the user engages in dialogue with card 202, it may be determined that the next card to be displayed is card 204; this navigation from card 202 to card 204 is an event 302. Card 204 has a yes-no question, where the user may use a control on an input device (e.g., a wheel, an arrow key, etc.) to toggle between the "yes" and "no" choices before entering a final selection of one of the choices. This toggling between choices on card 204 is an event 304. Once the user selects the "yes" or "no" choice, the user navigates either to card 208 or card 210 depending on the choice selected. In the example of FIG. 3, the choice results in navigation to card 210. The navigation from card 204 to card 210 is an event 306. Once the browser is pointed to card 210, the user may position the cursor in a field on card 210. In this example, the user positions the cursor to the "account number" field, and this positioning of the cursor is an event 308. It will be appreciated the events shown in FIG. 3 are merely exemplary of the types of actions that are significant in the sense that they affect the state of a browser. In greater generality, anything that happens on the browser that affects the context in which the user's next input to the browser will be interpreted (e.g., movement from page-to-page, movement from card-to-card, movement within a card, a change of font, etc.) can potentially constitute an event. Whether a given event is sufficiently significant to be signaled by the browser or captured by a state-capturing mechanism depends on the level of granularity with which the browser state is defined.

State Capturing and State Synchronization

Figure 4:
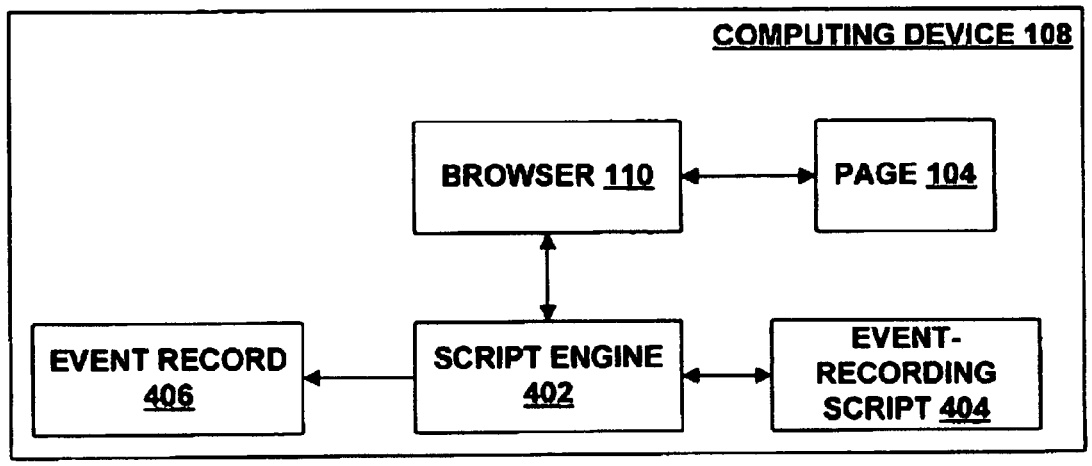
FIG. 4 is a block diagram of a system that records state information according to a first exemplary embodiment of the invention.

Turning to FIG. 4, a system is shown for the capture of events that occur during navigation. In the example of FIG. 4, browser 110 executes on computing device 108. As shown in FIG. 1 and discussed above, browser 110 is a visual browser, although it will be understood that a visual browser is not limiting of the invention, as events may be generated and captured with any type of browser (including, for example, voice browser 114 shown in FIG. 1); the use of visual browser 110 in FIG. 4 is for illustrative purposes only. Page 104 is loaded into a memory of computing device 108, and browser 110 interacts with page 104. As discussed above, this interaction may include receiving input from a user, navigating among cards on page 104, and rendering the various cards on an output device associated with computing device 108. As this interaction occurs, events are generates on browser 110; examples of these events are discussed above in connection with FIG. 3.

Browser 110 is adapted to signal events in such a way that specific actions can be taken in response to the occurrence of events. As one example, browser 110 may be coupled to script engine 402. Script engine 402 interprets scripts written in a scripting language such as JAVA, and causes computing device 108 to perform actions based on such scripts. (While script engine 402 is shown as being external to, and communicatively coupled with, browser 110, it should be noted that this structure is merely exemplary; in the alternative, browser 110 may include script engine 402.) An example of such a script that may be executed by script engine is event-recording script 404. Event recording script 404 contains interpretable code that is invoked upon each event generated in browser 110, where this code performs the function of recording the generated event and memorializing the event in event record 406. For example, one of the events generated by browser 110 may be a navigation from card 202 to card 204 (e.g., event 302, shown in FIG. 3). Thus, the event of navigating from one card to another may invoke a particular piece of code within event-recording script 404 that causes information to be deposited in event record 406 indicating that the user has navigated from card 202 to card 204. The invention is not limited by any particular implementation of event-recording script 404, but, as one example, there may be a method in event-recording script 404 that handles any event of moving from one card to another, where that method takes, as a parameter, the identity of the destination card (i.e., the card to which the browser points after the navigation has occurred), and writes that identity into event record 406. In this example, other methods may handle events such as a change of page, cursor movement, etc., where these methods take parameters indicative of the particular event that has taken place (e.g., which page the user has navigated to, where the cursor has been positioned, etc.).

Event record 406 may be used to synchronize browser 114 (shown in FIG. 1), or some other browser, to the same state as browser 110. It should be noted that there are various ways in which event record 406 can be used to synchronize browser 114 with browser 110, and the invention is not limited to any such technique. In one example, browser 110 may send event record 406 to browser 114, and browser 114 may step through the recorded events. As another example, rather than sending browser 114 an exact copy of event record 406, event record 406 may be sent to browser 114 in a compressed form, which may then be uncompressed by browser 114 (or by some compression/decompression tool residing on the computing device 112 on which browser 114 executes). Alternatively, the information in event record 406 may be "collapsed" prior to sending that information to browser 114. "Collapsed," in this context, means that events that cancel each other out (e.g., events that lead from a given card back to the same card, events that lead the cursor from a given location on a card back to the same location, etc.) may be removed, since the effect of these events is a nullity. Moreover, event record 406 (or some information derived therefrom) may be sent either continuously, at some pre-determined frequency, on some pre-set schedule, on demand, etc. An event that results in sending event record 406, or the derived information, can be referred to generally as a "triggering event."

Moreover, although browser 110 may send event record 406, or the information derived therefrom, directly to browser 114, in an alternative embodiment browser 110 sends event record 406 or the derived information to state manager 124 (shown in FIG. 1). State manager 124 receives information indicative of the events that have occurred, and manages the sending of this information to browser 114. For example, state manager 124 may collect state information sent by browser 110 and store this state information in data store 126. State manager 124 may send the state information along to browser 114 at an appropriate time (e.g., continuously, at some pre-determined frequency, on some pre-set schedule, on demand, or upon any other type of "triggering event"). In a preferred embodiment of the invention, browsers 110 and 114 are visual and voice browsers, respectively, and one of the browsers synchronizes to the state of the other at the time that a user switches between voice I/O and visual I/O (i.e., a "mode change"). In such an example, state manager 124 sends state information to browser 114 at the time of such a mode change, and the mode change itself is the "triggering event" that causes state manager 124 to send state information to browser 114. However, it should be understood that a mode change is merely exemplary of such a triggering event, and is not limiting of the invention.

Moreover, it should be understood that, while FIG. 4 shows browser 110 recording events so that browser 114 may be synchronized to the state of browser 110, it may be the case that two browsers are configured to synchronize mutually. That is, browser 114 may also record events so that browser 110 can receive the data created by browser 114, and so that browser 110 can be synchronized to the state of browser 114. In one embodiment, browser 110 and browser 114 may communicate state information to each other through state manager 124, and it may be possible for synchronization to occur in either direction. That is, browsers 110 and 114 may, in a preferred embodiment, be configured such that either browser can be synchronized to the state of the other browser.

Figure 5:
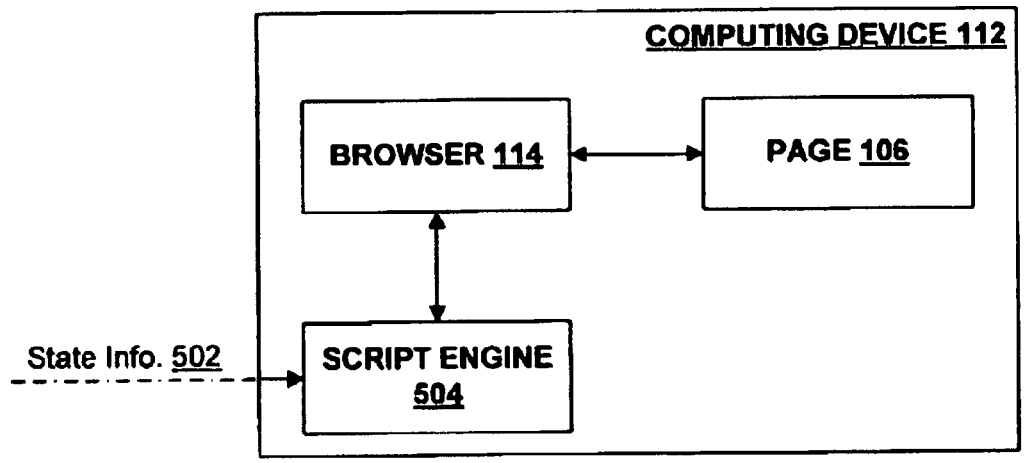
FIG. 5 is a block diagram of a system that uses recorded state information in accordance with aspects of the invention.

FIG. 5 shows one example of how browser 114 can use state information to put itself in the same state as browser 110. In the example of FIG. 5, computing device 112 (on which browser 114 executes) receives state information 502. For example, state information 502 may be in the form of a script that is executable by script engine 504 associated with (or included within) browser 114. Alternatively, state information 502 may exist in any form that communicates the state of browser 110. In the example of FIG. 5, page 106 (e.g., the voice markup version of the content 102 embodied in visual markup page 104) is loaded onto computing device 112, and browser 114 renders and interacts with page 106. Script engine 504 executes the script contained in state information 502, thereby causing browser 114 to navigate through page 106 in the same manner that browser 110 navigated through page 104. After this process is carried out, browser 114 points to a place in page 106 that is equivalent to that which browser 110 points on page 104 at the time the state information is recorded.

It should be noted that, while pages 104 and 106 represent the same content 102, their representations of that content is not necessarily identical. Returning briefly to FIG. 1, it will be recalled that, in the example of FIG. 1, page 104 is a visual markup language representation of content 102, and page 106 is a voice markup language representation of content 102. While the visual and voice markup languages may provide similar structures (e.g., cards within a page, fields within a card, etc.) there are certain concepts that may not have exactly a one-to-one correspondence between the two markup languages. For example, the visual markup language may permit a font to be specified—a concept that may have no analogue in a voice markup language. Thus, an event that changes the font in the visual language may, depending upon the implementation, have no effect on the state of the voice browser when the two browsers are synchronized. (On the other hand, a change in font could have an affect on the state, if a change in visual font is deemed equivalent to, say, a change in the pitch of the voice. Whether an event on one browser has an equivalent event on another browser—and what events are deemed equivalent—is a design decision to be made by the designer and/or implementor of a synchronization mechanism in accordance with the invention.)

Figure 6:
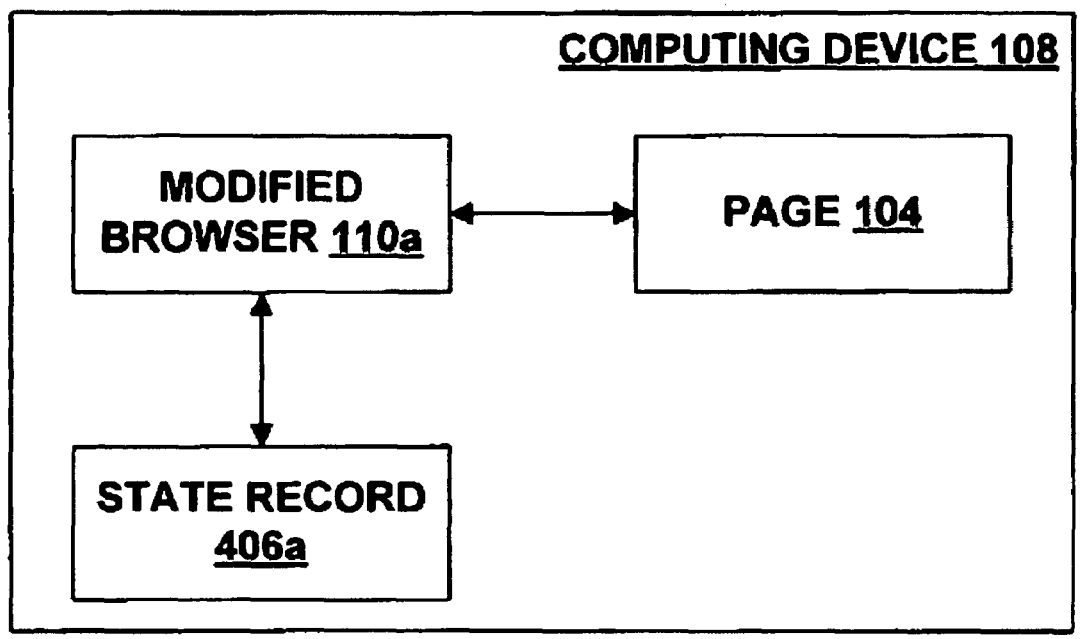
FIG. 6 is a block diagram of a system that records state information according to a second exemplary embodiment of the invention.

FIG. 6 shows a system for recording state information, which is in contrast to the script-based event-recording system of FIG. 4. In FIG. 6, computing device 108 executes modified browser 110a instead of browser 110. Modified browser 110a contains functionality to deposit a record 406a of its state, and thus creates state record 406a directly, in contrast to browser 110 which creates event record 406 using a script engine. The state record 406a created by browser 110a may, for example, be similar to event record 406 in that browser 110a may simply contain functionality to write a historical record of events into state record 406a. Alternatively, browser 110a may be adapted to write a different type of state record 406a (i.e., one that is not based on a historical record of events), and thus state record 406a is not limited to a historical record of events.

Figure 7:
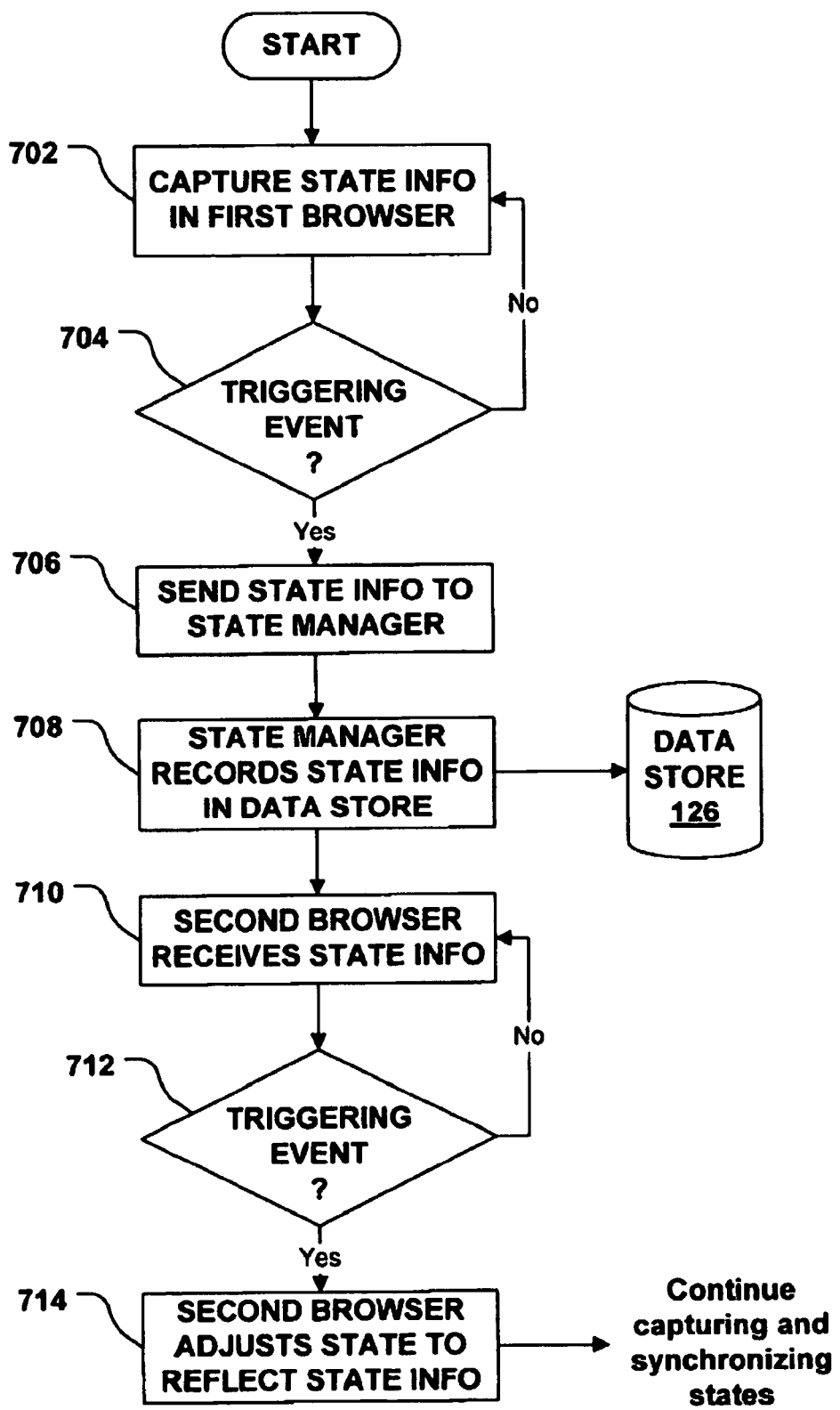
FIG. 7 is a flow diagram of a process of synchronizing two browsers in accordance with aspects of the invention.

A process of recording state information, and of using the recorded information to synchronize a second browser to the state of a first browser, is shown in FIG. 7. At step 702, state information is captured in the first browser. As one example, this capturing may include creating a historical record of the occurrence, in the first browser, of certain pre-defined events (e.g., movement from one card to another, positioning of a cursor, etc.). Moreover, as noted above, the recording of events may occur by using the events to invoke scriptable code, as shown in FIG. 4. However, it should be noted that the creation of state information is not limited to the use of a recording script. Moreover, the invention is not limited to the case in which the state information comprises a historical record of events. On the contrary, the invention encompasses any method that captures the state of the first browser.

At step 704, it is determined whether a triggering event has occurred. The "triggering event" detected at step 704 is an event that causes state information to be transmitted by the device on which the first browser executes to another device. The following is a non-exhaustive list of triggering events: expiration of a timer, a demand for synchronization to take place, or a "mode change" that results in browsing being switched from the first browser to the second browser (e.g., from a visual browser to a voice browser). However, it should be understood that the foregoing list is non-exhaustive, and that any triggering event may be detected at step 704 without departing from the spirit and scope of the invention. If it is determined at step 704 that no triggering event has occurred, then the process returns to step 702 to capture more state information.

If it is determined at step 704 that a triggering event has occurred, then the captured state information is sent from the first browser to the second browser. The sending of state information from the first browser to the second browser may, optionally, include sending the state information to a state manager 124 (step 706), whereby state manager 124 stores the state information in data store 126 (step 708) for forwarding to the second browser at an appropriate time. However, the use of state manger 124 is not limiting of the invention, and the first browser may forward captured state information directly to the second browser.

At step 710, the second browser receives state information that was captured by the first browser. As noted above, this state information may be received directly from the first browser, or, alternatively, may be received indirectly through a state manager that performs functions including the collecting of state information to be forwarded at an appropriate time.

At step 712, it is determined whether an event occurs that triggers the second browser to synchronize its state to that of the first browser. Events that may trigger synchronization are non-exhaustively listed above in connection with step 704. If no triggering event has occurred, the process returns to step 710, wherein the second browser continues to receive state information captured by the first browser, and waits for a triggering event to occur. On the other hand, if a triggering event is detected at step 712, then the second browser adjusts its state to reflect the received state information (step 714). As discussed above, one way that this state adjustment can take place is if the state information includes a historical record of events that have occurred on the first browser, in which case the second browser may step through that same sequence of events (where the events may have, optionally, undergone a "transformation" to account for the fact that the first and second browser may be rendering the same content in slightly different formats (e.g., in different markup languages)).

Following the adjustment of the second browser to reflect the state of the first, the two browsers continue with the process of capturing state data, and each browser's adjusting its state to reflect the state data captured by the other. It should be noted that this process of capturing and adjusting is a mutual process that proceeds in both directions. That is, each browser is capable of capturing state data (which is generally done when the browser is being used by a user to perform navigation), and is also capable of synchronizing to a given state based on the state data provided by the other browser. Thus, while FIG. 7 contains references to a "first" browser that captures state information, and a "second" browser that adjusts to the state captured by the first browser, it will be understood that the process of capturing and adjusting is bi-directional, and thus the first and second browsers' roles can be reversed.

Exemplary Environment for Synchronization of Visual and Voice Browsers

Figure 8:
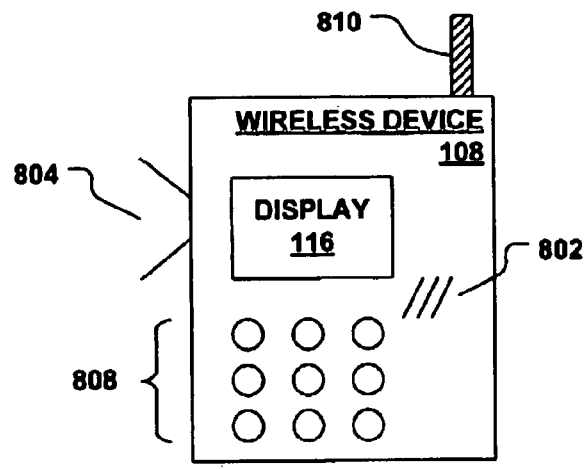
FIG. 8 is a diagram of an exemplary device that performs plural types of input and output using plural synchronized browsers, and in which aspects of the invention may be deployed.

With reference to FIGS. 8 and 9, there is shown an exemplary environment in which aspects of the invention may be deployed.

FIG. 8 shows an exemplary embodiment of computing device 108 which executes visual browser 110. Computing device 108 is, in this example, a digital wireless device that communicates with the world outside of computing device 108 using antenna 810. As one example, computing device 108 may be a wireless telephone, although it should be understood that other types of devices are within the spirit and scope of the invention. Computing device 108 executes visual browser 110. A user may interact with visual browser 110 by using display 116 to see the output of visual browser 110, and by using input devices (e.g., keypad 808, and a touch-screen feature of display 116) to provided input to visual browser 110. Preferably, computing device 108 includes microphone 802 and speaker 804, which permits computing device 108 to capture and render audio. In one example, computing device 108 is "dumb" with respect to audio input and output—that is, computing device 108 captures audio using microphone 802 and packages this audio in the form of digital signals to be sent through antenna 810, but does not interpret or otherwise process the audio. Similarly, computing device 108 receives digital audio signals through antenna 810 and renders those signals speaker 804, but does not interpret or process the audio.

The exemplary computing device 108 shown in FIG. 8 operates within a network architecture 900, features of which are shown in FIG. 9. Computing device 108 connects to network 900 by using antenna 810 to send information to, and receive information from, tower 906. The information that is sent between antenna 810 and tower 906 includes data 902 and voice 904. Application server 910 runs an application 912 that is used by a user of computing device 108. For example, application 912 may be a map application that provides driving directions to a user of computing device 108. Application server stores content to be provided (e.g., maps, directions, an interface to request maps and directions, etc.) in two forms—a visual markup language (e.g., WML) and a voice markup language (e.g., VXML). (Application server may also use application 912 to generate certain content that is not permanently stored; for example, map applications typically generate directions in response to a request; in this case, map application may generate the content of the directions in both visual and voice markup languages.)

Because visual browser 110 executes on computing device 108, application server 910 provides content in the form of visual markup language directly to computing device 108. That is, when the application 912 is operating in visual mode, application server 912 provides visual markup language content to switch 908, so that such content can be sent out to computing device 108. Computing device 108 then uses visual browser 110 to interact with a user of computing device 108 on the basis of the visual markup content. However, computing device 108, in this example, does not run a voice browser; rather, computing device 108 merely accepts audio input for voice browser 114 and renders audio output generated by voice browser 114. Voice browser 114 runs on computing device 112 which, in the example of FIG. 9, is a "voice server." When application 912 is operating in voice mode, application 912 sends content in the voice markup language to voice server 112; voice server 112, in turn, uses voice browser 114 to render audio output and interpret audio input received from computing device 108. Voice server 112 provides audio output to switch 908 to be sent to computing device 108, and also receives audio input from computing device 108 via switch 908.

Because visual browser 110 and voice browser 114 are located separately from each other in the example of FIG. 9, a technique in accordance with the present invention may be used to synchronize between voice and visual browser. That is, when application 912 operates in visual mode, visual browser 110 may capture state data generated while application 912 is operating in visual mode; upon a change to voice mode, the captured state data may be used to place voice browser 114 in the state that visual browser 110 was in at the time that the change occurred. Similarly, when application 912 operates in visual mode, browser 114 may capture state data generated during such use; when the mode is changed back to visual, visual browser 110 may use the state data captured by voice browser 114 in order to put itself in the same state that voice browser was in at the time that the change occurred. By using this technique, the change between visual and voice modes may appear "seamless," notwithstanding that the voice and visual browsers are located remotely with respect to each other.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

We claim:

1. A system for using a visual browser for navigation through a collection of data and synchronization of the state of a voice browser with the state of said visual browser, said system comprising:

a first wireless device further comprising:

a first memory to store a first set of data and a first set of instructions;

a first processor to execute said first instruction set and manipulate said first data set;

a visual display for displaying visual output;

an input device for accepting user data from a user;

an audio speaker to render audio output;

a microphone to accept audio input; and said visual browser stored in said first memory and operating in said first wireless device for interacting with a content page using one or more of said user data and said first data set, wherein said visual browser stores said visual browser state indicating a state of interaction with said content page, and wherein said visual browser displays said interaction through said visual display;

a state manager for receiving said visual browser state and providing said received visual browser state to said voice browser to recreate the visual browser state at said voice browser at one of a plurality of granularity levels specified by said user, wherein each of said granularity levels represent the precision with which the voice browser recreates the visual browser state, and wherein said granularity levels comprise one of a page level granularity, a card level granularity, a field level granularity, and a cursor level granularity; and a second device further comprising:

a second memory to store a second set of data and a second set of instructions;

a second processor to execute said second instruction set and manipulate said second data set;

said voice browser storable in said second memory and executable on said second processor, wherein the voice browser enables interaction of said user with said content page using said audio speaker and said microphone, and receives said visual browser state from said state manager;

wherein said first wireless device is in communication with said second device and said state manager through a network;

whereby the state of the voice browser is synchronized with the state of the visual browser from the information received from said state manager.

2. The system of claim 1, further comprising a data store for storing said visual browser state received by said state manager.

3. The system of claim 1, wherein said visual browser state comprises a historical record of events occurring during said navigation.

4. The system of claim 1, wherein said state manager allows said user to seamlessly switch between said visual browser and said voice browser when said voice browser state is synchronized with said visual browser state.

5. The system of claim 1, wherein said page level granularity comprises synchronization of said voice browser to point to said content page being browsed by said visual browser.

6. The system of claim 1, wherein said card level granularity comprises synchronization of said voice browser to point to a card within said content page, wherein said visual browser is browsing within said card of said content page.

7. The system of claim 1, wherein said field level granularity comprises synchronization of said voice browser to point to a field within a card in said content page, wherein said visual browser is browsing within said field in said card of said content page.

8. The system of claim 1, wherein said cursor level granularity comprises synchronization of said voice browser to point to the cursor position in the visual browser.

9. A system for using a voice browser for navigation through a collection of data and synchronization of the state of a visual browser with state of said voice browser, said system comprising:
   a first wireless device further comprising:
      a first memory to store a first set of data and a first set of instructions;
      a first processor to execute said first instruction set and manipulate said first data set;
      a visual display for displaying visual output;
      an input device for accepting user data from a user;
      an audio speaker to render audio output;
      a microphone to accept audio input;
      said visual browser stored in said first memory and operating in said first wireless device;
   a second device further comprising:
      a second memory to store a second set of data and a second set of instructions;
      a second processor to execute said second instruction set and manipulate said second data set;
      said voice browser storable in said second memory and executable on said second processor, wherein the voice browser enables interaction with a content page using said audio speaker and said microphone, and wherein said voice browser sends said voice browser state indicating a state of interaction with said content page to a state manager;
      wherein said first wireless device is in communication with said second device and said state manager via a network; and
   said state manager for receiving said voice browser state and providing said received voice browser state to said visual browser for allowing said visual browser to recreate the voice browser state at one of a plurality of granularity levels specified by said user, wherein each of said granularity levels represent the precision with which the visual browser recreates the voice browser state, and wherein said granularity levels comprise one of a page level granularity, a card level granularity, a field level granularity, and a cursor level granularity; and
   whereby the voice browser state is synchronized with the visual browser state from the information received from said state manager.

10. The system of claim 9, further comprising a data store for storing said voice browser state received by said state manager.

11. The system of claim 9, wherein said voice browser state comprises a historical record of events occurring during said navigation.

12. The system of claim 9, wherein said state manager allows said user to seamlessly switch between said voice browser and said visual browser, when said visual browser state is synchronized with said voice browser state.

13. The system of claim 9, wherein said page level granularity comprises synchronization of said visual browser to point to said content page being browsed by said voice browser.

14. The system of claim 9, wherein said card level granularity comprises sycnchronization of said visual browser to point to a card within said content page, wherein said voice browser is browsing within said card of said content page.

15. The system of claim 9, wherein said field level granularity comprises synchroniztion of said visual browser to point to a field within a card in said content page, wherein said voice browser is browsing within said field card of said content page.

16. The system of claim 9, wherein said cursor level granularity comprises synchronization of said visual browser to point to cursor position pointed by said voice browser.

17. A system of using a visual browser for navigation through a collection of data, resulting in the generation of events, and the synchronization of the state of a voice browser with the state of said visual browser, comprising:
   a first device further comprising:
      a first memory to store a first set of data and a first set of instructions;
      a first processor to execute said first instruction set and manipulate said first data set;
      a visual display for displaying visual output;
      an input device for accepting user data from a user;
      an audio speaker to render audio output;
      a microphone to accept audio input;
      said visual browser stored in said first memory and operating in said first device for interacting with a content page using one or more of said user data and said first data set, wherein said visual browser displays said interaction through said visual display;
   a script engine for recording the generated events by executing instructions in a script, wherein said script comprises a plurality of sets of instructions interpretable by the script engine, and wherein each of said sets of instructions being adapted to create a record of a particular one of the events, said script engine being adapted to invoke a particular one of said sets of instructions according to which said events is signaled by said visual browser; and
   a second device further comprising:
      a second memory to store second set of data and second set of instructions;
      a second processor to execute said second instruction set and manipulate said second data set;
      said voice browser storable in said second memory and executable on said second processor for enabling interaction with said content page using said audio speaker and said microphone;
      wherein said first wireless device is in communication with said second device and a state manager via a network; and
      wherein said state manager receives the record of events created by said script engine and provides the record of events to the voice browser;
   whereby the voice browser recreates the state of the visual browser.

18. A system of using a voice browser for navigation through a collection of data, resulting in the generation of events, and the synchronization of the state of a visual browser with the state of said voice browser, comprising:
   a first device further comprising:
      a first memory to store a first set of data and a first set of instructions;
      a first processor to execute said first instruction set and manipulate said first data set;
      a visual display for displaying visual output;
      an input device for accepting user data from a user;
      an audio speaker to render audio output;
      a microphone to accept audio input;
      said visual browser storable in said first memory and operating in said first device for interacting with a content page using one or more of said user data and said first data set, wherein said visual browser displays said interaction through said visual display;

a script engine for recording the generated events by executing instructions in a script, wherein said script comprises a plurality of sets of instructions interpretable by the script engine, and wherein each of said sets of instructions being adapted to create a record of a particular one of the events, said script engine being adapted to invoke particular one of said sets of instructions according to which of said events is signaled by said voice browser; and a second device further comprising:

a second memory to store a second set of data and a second set of instructions;

a second processor to execute said second instruction set and manipulate said second data set;

said voice browser storable in said second memory and executable on said second processor for enabling interaction with said content page using said audio speaker and said microphone;

wherein said first wireless device is in communication with said second device and a state manager via a network;

and wherein said state manager receives the record of events created by said script engine, and provides the record of events to the visual browser;

whereby the visual browser recreates the state of the voice browser.

* * * * *